United States Patent
Zhou et al.

(10) Patent No.: US 6,705,092 B1
(45) Date of Patent: Mar. 16, 2004

(54) VAPOR MEMBRANE DEHUMIDIFICATION FOR AIR CYCLE ENVIRONMENT CONTROL SYSTEM

(75) Inventors: Shaojun Zhou, Palatine, IL (US); Tim Birbeck, Manhattan Beach, CA (US); Michel A. Jonqueres, Torrance, CA (US)

(73) Assignee: Honeywell International Inc., Morristown, NJ (US)

( * ) Notice: Subject to any disclaimer, the term of this patent is extended or adjusted under 35 U.S.C. 154(b) by 83 days.

(21) Appl. No.: 09/992,671

(22) Filed: Nov. 14, 2001

(51) Int. Cl.⁷ .............................. F25D 9/00; B01D 19/00
(52) U.S. Cl. ................... 62/87; 62/93; 62/401; 62/402; 96/6
(58) Field of Search ..................... 62/401, 402, 87, 62/93; 96/6

(56) References Cited

U.S. PATENT DOCUMENTS

| | | | |
|---|---|---|---|
| 4,198,830 A | 4/1980 | Campbell | |
| 4,487,618 A | 12/1984 | Mann | |
| 5,034,025 A | 7/1991 | Overmann, III | |
| 5,086,622 A | 2/1992 | Warner | |
| 5,131,929 A | * 7/1992 | Brockmann et al. | 95/52 |
| 5,190,569 A | 3/1993 | McGrath | |
| 5,236,474 A | * 8/1993 | Schofield et al. | 95/47 |
| 5,259,869 A | 11/1993 | Auvil et al. | |
| 5,423,129 A | 6/1995 | Castle et al. | |
| 5,461,882 A | 10/1995 | Zywiak | |
| 5,605,564 A | * 2/1997 | Collins | 95/52 |
| 5,660,048 A | 8/1997 | Belding et al. | |
| 5,681,368 A | * 10/1997 | Rahimzadeh | 95/19 |
| 5,885,329 A | * 3/1999 | Hermann | 95/22 |
| 5,887,445 A | * 3/1999 | Murry et al. | 62/402 |
| 6,027,546 A | * 2/2000 | Kusters et al. | 95/113 |
| 6,484,525 B1 | * 11/2002 | Piao et al. | 62/271 |
| 6,484,528 B1 | * 11/2002 | Piao et al. | 63/324.2 |
| 6,539,744 B1 | * 4/2003 | Piao et al. | 62/402 |
| 2001/0035092 A1 | * 11/2001 | Hachimaki et al. | 96/6 |

FOREIGN PATENT DOCUMENTS

| | | |
|---|---|---|
| EP | 0 263 212 A | 4/1988 |
| FR | 2 571 270 A | 4/1986 |
| GB | 2 139 110 A | 11/1984 |
| WO | WO00/36345 | * 6/2000 |

* cited by examiner

*Primary Examiner*—William C. Doerrler
(74) *Attorney, Agent, or Firm*—William J. Zak, Jr., Esq.

(57) ABSTRACT

The vapor membrane dehumidification device and method for air cycle environment control systems uses a semipermeable vapor membrane for water vapor, air separation. The vapor membrane has a high water to air permselectivity. When air containing water vapor is passed over or through the semipermeable fibers of the membrane countercurrently or crosscurrently to a purge air stream the water vapor may permeate through the fibers. Using a purge air stream of lower water vapor partial pressure relative to the feed moist air stream, the water vapor is moved to the purge air stream due to the partial pressure differential of water vapor and then expelled overboard with the purge air stream. The purge air stream can be replaced with any source of air internal or external to the aircraft such as air from the aircraft cabin.

38 Claims, 4 Drawing Sheets

VAPOR MEMBRANE DEHUMIDIFICATION FOR AIR CYCLE ENVIRONMENT CONTROL SYSTEM

BACKGROUND OF THE INVENTION

This invention relates to air cycle environment control systems that condition air and more specifically to the apparatus that cool, filter, pressurize, remove moisture and otherwise condition cabin air. The new dehumidification device uses a vapor membrane to separate moisture from gasses.

Current air cycle environmental control system (ECS) designs, especially in the application for aircraft air conditioning, have included therein 2, 3, and 4 wheel air cycle machines, with high pressure water separation cycles. All three of the ECS designs typically utilize a reheater and a condenser heat exchanger to respectively pre-cool the bleed moist air stream and then condense the water vapor in it. After condensation, the condensed water is removed by a water extractor. This water phase change, condensation, coalescence or like method, involves an enthalpy penalty due to the energy necessary to effect the transition of water from vapor to liquid phase. The general distinction among the three designs relates to the number of so-called wheels that are mechanically engaged to one another. Examples of such air cycle environment control systems are disclosed in U.S. Pat. No. 4,198,830 (issued Apr. 22, 1980), U.S. Pat. No. 5,086,622 (issued Feb. 11, 1992), U.S. Pat. No. 5,461,882 (issued Oct. 31, 1995), U.S. Pat. No. 5,887,445 (issued Mar. 30, 1999).

In the traditional air cycle environment control systems a reheater, condenser and water extractor are included for cooling and conditioning water bearing compressed air, condensing the water vapor present in it, and trapping and removing the liquid water. The resulting dehumidified air flows to the reheater where the remaining water droplets are evaporated, leaving the residual moisture in the vapor phase. Other means of removing moisture from air include vapor cycle environmental control systems that in principle is refrigeration based air cooling and water vapor condensing system, adsorption by solid desiccants, absorption by liquid desiccants, etc. An example of a water adsorption based system is disclosed in U.S. Pat. No. 5,660,048, issued Aug. 26, 1997. The invention includes a desiccant wheel for selective adsorption of water molecules. The adsorption surfaces are then regenerated by use of high temperature gas flow or a vacuum condition to complete an adsorption/desorption cycle.

These adsorption/desorption stages and associated equipment may be removed from the air conditioning system and replaced with a vapor membrane device. The water is then removed in its vapor state thereby avoiding the condensation into the liquid state. Therefore no heat of condensation is released and the efficiency of the air conditioning cycle is improved providing a thermodynamic advantage.

Other air conditioning designs include those devices that are structured to trap water vapor. U.S. Pat. No. 4,487,618, Issued Dec. 11, 1984 is an example of such a device. In this instance a wire fiber pad is used to coalesce water vapor into droplets that are then entrained by the air to be trapped as droplets for removal in the liquid state. Again such systems include the vapor to liquid state change to remove water that does not include the thermodynamic efficiency of a single vapor state extraction methodology.

As can be seen, there is a need for a less complex, improved efficiency device and method to extract water from air in air conditioning systems.

SUMMARY OF THE INVENTION

An improved dehumidification device for air cycle environment control systems according to the present invention comprises a semipermeable vapor membrane for water vapor, gas separation. In the preferred embodiment a vapor membrane device is inserted downstream of an air cycle environment control systems primary or secondary heat exchanger and upstream from the turbine. The moist air stream is passed countercurrent or cross flow relative to purge airflow on two sides of the semipermeable vapor membrane. The pressure differential between the two air streams on the feed and purge sides of the membrane causes water vapor to permeate to the purge air stream. The water vapor present in the purge air is then expelled overboard with the purge air.

These and other features, aspects and advantages of the present invention will become better understood with reference to the following drawings, description and claims.

DESCRIPTION OF THE PREFERRED EMBODIMENT

The following detailed description is the best currently contemplated modes for carrying out the invention. The description is not to be taken in a limiting sense, but is made merely for the purpose of illustrating the general principles of the invention.

Figure 1:
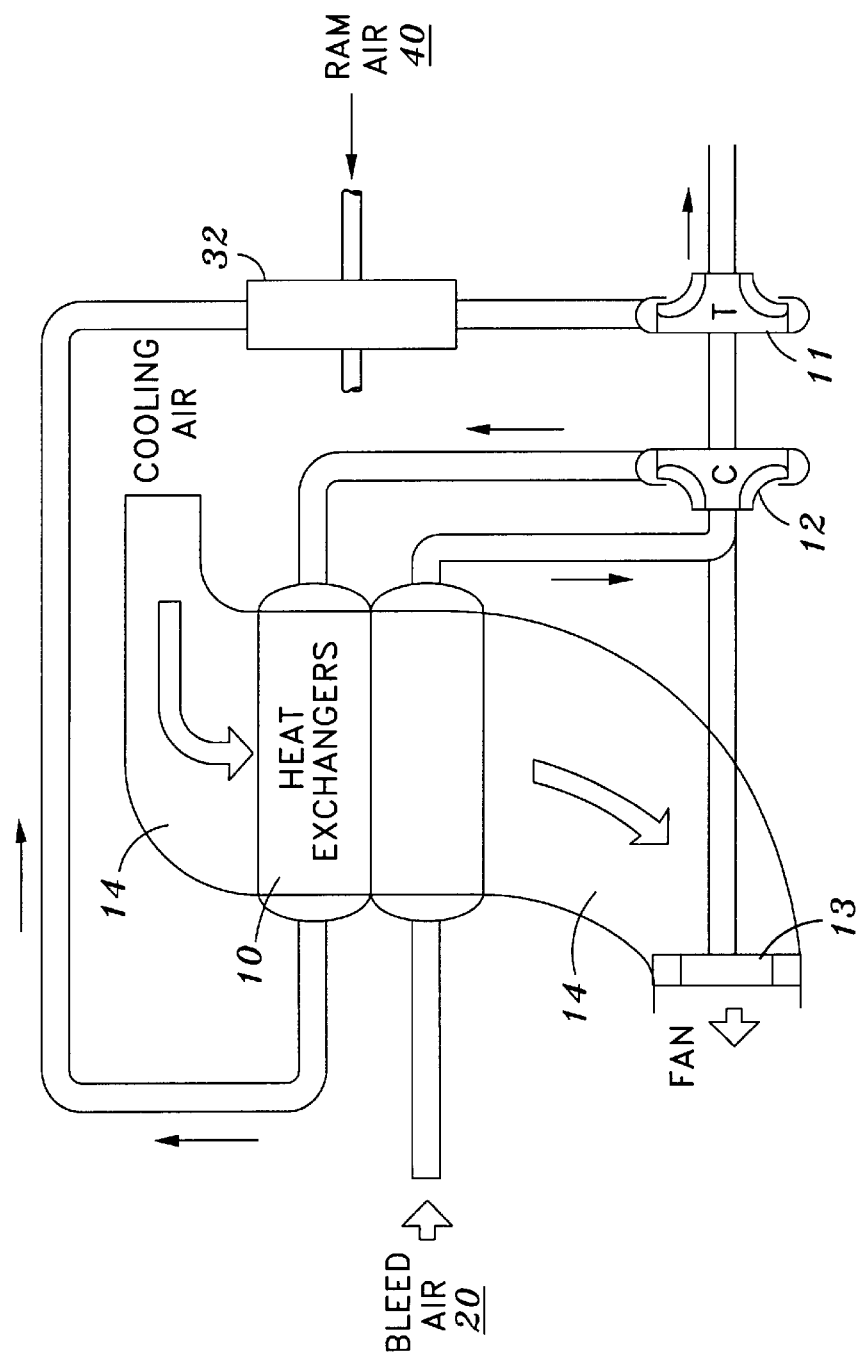
FIG. 1 illustrates a functional flow schematic of an air cycle environment control system into which the present invention is inserted.
Figure 2:
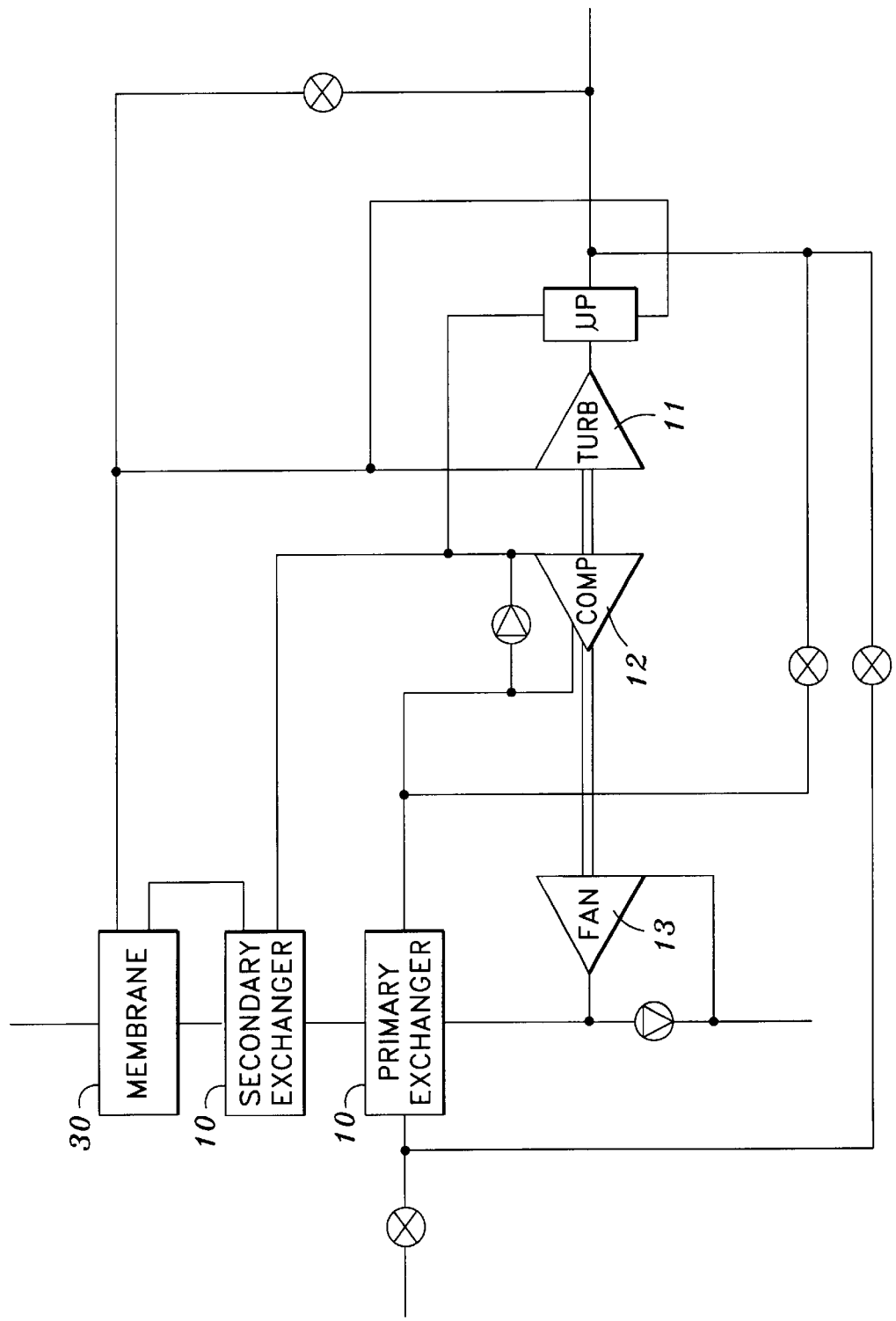
FIG. 2 illustrates a schematic of an air cycle environment control system with the vapor membrane device of the present invention.

Referring to FIGS. 1 and 2, an air cycle environment control system is illustrated having heat exchangers 10, turbine 11, compressor 12, fan 13 and air duct 14. The bleed or feed wet air 20 downstream of the primary or secondary heat exchangers would be passed through the vapor membrane 30 upstream of the turbine 11. Ram air 40 is also passed through the vapor membrane 30 in a countercurrent or cross flow pattern relative to the bleed air 20. The ram air 40 has a lower partial pressure of water relative to the bleed air 20. Use of the vapor membrane 30 eliminates the need for a high-pressure water separator and the associated condenser/reheater loop.

Figure 3:
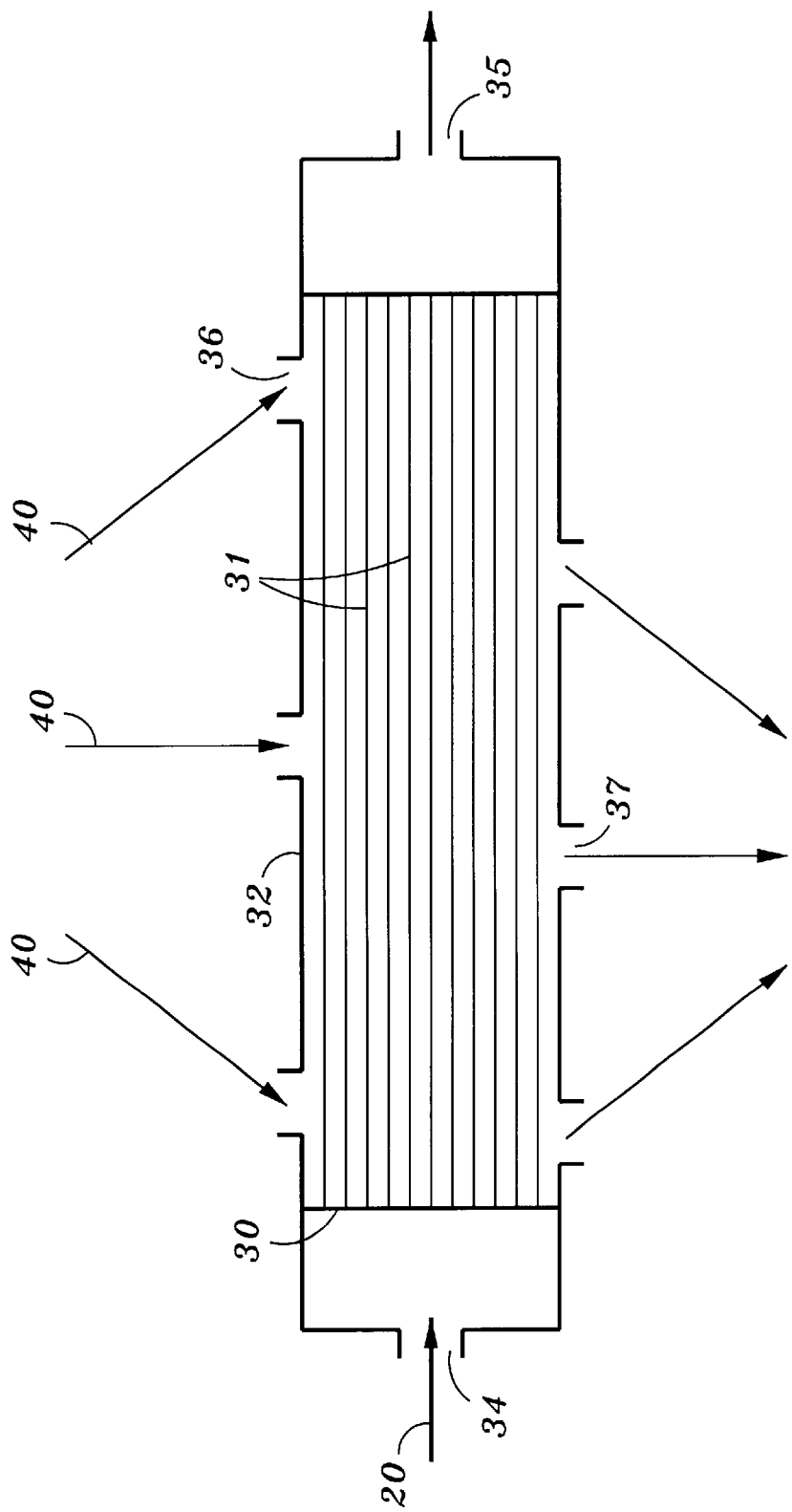
FIG. 3 illustrates the vapor membrane structure with countercurrent or crosscurrent flow gas paths.

Referring to FIG. 3, the vapor membrane 30 is comprised of hollow semipermeable fiber elements 31 in filter 32. The feed wet air 20 may be directed to flow either through the interior of the fibers 31 or exteriorly thereto. The ram air 40 is directed countercurrent or cross flow, to flow either through the interior of the fibers 31 or exterior thereto. As the air moves through the vapor membrane water vapor is removed from the wet air 20 and deposited in the ram air 40 or other purge air stream. This process does not require a change in state of the water from vapor to liquid.

The feed wet air 20 flow is introduced at air inlet port 34 to flow interior to hollow fibers 31 and exit through air exit port 35. The ram air 40 flow is introduced at inlet port 36 to flow exterior to hollow fibers 31 and exit through exit port 37. The water vapor deposited in the ram air 40 flow is discharged from the cycle environment control system through the ram air circuit.

The vapor membrane 30 has no moving parts and removes water continuously. The water partial pressure difference between the feed wet air 20 flow and ram air 40 flow causes the water vapor to move through the vapor membrane 30 to be captured by the ram air 40. The vapor membrane 30 structure presents a high water to air selectivity. That is, the vapor membrane 30 selectively facilitates the movement of water vapor therethrough and inhibits the movement of nitrogen or air. Any polymeric or inorganic materials that are highly permeable to water vapor and highly impermeable to air can be used for the semi permeable fiber elements 31. Some examples, but not limited to, materials that may be used to make the hollow fiber vapor membrane 30 are polysulfone, Nafion™, polyimide, polyolefin, polyamide and polyvinyls. The water vapor permeation flux of the said membrane should be greater than about 1000 Barrer/cm, or more preferably greater than about 5000 Barrer/cm. The water vapor to air permselectivity of the said membrane should be greater than about 200, or more preferably greater than about 500.

Figure 4:
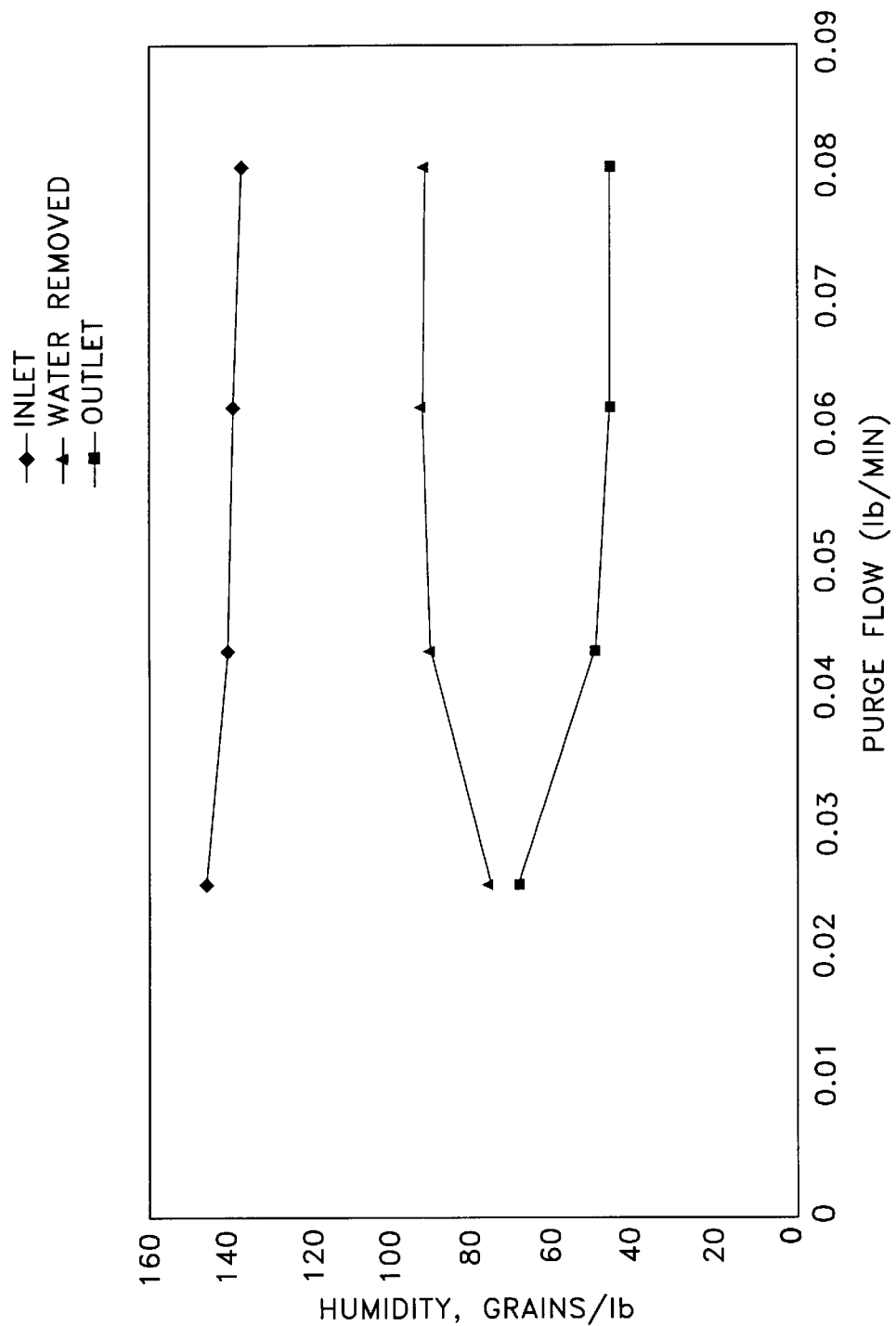
FIG. 4 illustrates a chart of the water removal efficiency of a vapor membrane.

Experiments with vapor membrane 30 devices have indicated that the thermodynamic advantage of the preferred embodiment relative to similar 3 wheel pack air conditioning systems may provide an efficiency factor of about 120 to 200% depending on how much water is removed in the vapor state. The size and weight advantage of air conditioning systems with vapor membrane dehumidification may be as much as approximately 60% as compared to known similar 3 wheel pack systems. FIG. 4 illustrates the water removal efficiency of a vapor membrane 30.

Although one or more specific embodiments have been described it can be appreciated that various modifications and changes can be made without departing from the scope of the present invention as disclosed. For example, it is to be understood that the purge air need not be limited to ram air and further that the purge can be any source of air internal or external to the aircraft with a lower water vapor partial pressure relative to the moist air stream such as purge air from the aircraft cabin.

While the invention has been particularly shown and described with respect to the illustrated and preferred embodiments thereof, it will be understood by those skilled in the art that the foregoing and other changes in form and details may be made therein without departing from the spirit and scope of the invention.

We claim:

1. A device for dehumidification of a feed wet air flow for an air cycle environment control system comprising:

a vapor membrane formed of a plurality of semipermeable fiber elements;

said vapor membrane mounted in a filter having an air inlet port and an air exit port for flow through of said feed wet air flow containing water vapor; and said filter having inlet ports and exit ports for flow through of a stream of ram air in one of a countercurrent direction and a crosscurrent direction to said feed wet air flow, wherein a water partial pressure difference between said feed wet air flow and said stream of ram air causes said water vapor to move through said vapor membrane to be captured by said stream of ram air without changing to a liquid state.

2. The device as in claim 1 wherein said filter is insertable intermediate a turbine and one of a primary heat exchanger and a secondary heat exchanger of said air cycle environment control system.

3. The device as in claim 1 wherein said vapor membrane has a water vapor to air permselectivity greater than approximately 200.

4. The device as in claim 1 wherein said vapor membrane has a water vapor permeation flux greater than approximately 1000 Barrer/cm.

5. A device for dehumidification of a feed wet air flow for an air cycle environment control system comprising:

a vapor membrane formed of a plurality of semipermeable fiber elements;

said vapor membrane mounted in a filter having an air inlet port and an air exit port for flow through of a said feed wet air flow containing water vapor;

said filter having inlet ports and exit ports for flow through of a stream of ram air in one of a countercurrent direction and a crosscurrent direction to said feed wet air flow; and said filter structured to channel said feed wet air flow and said stream of ram air flow through said vapor membrane such that there is semi permeable fiber material therebetween, wherein a water partial pressure difference between said feed wet air flow and said stream of ram air causes said water vapor to move through said semipermeable fiber material to be captured by said stream of ram air.

6. The device as in claim 5 wherein said filter is insertable intermediate a turbine and one of a primary heat exchanger and a secondary heat exchanger of said air cycle environment control system.

7. The device as in claim 5 wherein said vapor membrane has a water vapor to air permselectivity greater than approximately 200.

8. The device as in claim 5 wherein said vapor membrane has a water vapor permeation flux greater than approximately 1000 Barrer/cm.

9. A device for dehumidification of a feed wet air flow for an air cycle environment control system comprising:

a vapor membrane formed of a plurality of hollow semipermeable fiber elements;

said vapor membrane mounted in a filter having an air inlet port and an air exit port for flow through of said feed wet air flow containing water vapor;

said filter having inlet ports and exit ports for flow through of a stream of ram air in one of a countercurrent direction and a crosscurrent direction to said feed wet air flow; and said filter structured to channel said feed wet air flow and said stream of ram air flow through said vapor membrane such that there is semi permeable fiber material therebetween, wherein a water partial pressure difference between said feed wet air flow and said stream of ram air causes said water vapor to move through said plurality of hollow semipermeable fiber elements of said vapor membrane to be captured by said stream of ram air.

10. The device as in claim 9 wherein said filter is insertable intermediate a turbine and one of a primary heat exchanger and a secondary heat exchanger of said air cycle environment control system.

11. The device as in claim 9 wherein said vapor membrane has a water vapor to air permselectivity greater than 200.

12. A device for dehumidification of a feed wet air flow for an air cycle environment control system comprising:

a vapor membrane formed of a plurality of hollow semipermeable fiber elements;

said vapor membrane mounted in a filter having an air inlet port and an air exit port for flow through of said feed wet air flow containing water vapor;

said filter having inlet ports and exit ports for flow through of a stream of ram air in one of a countercurrent direction and a crosscurrent direction to said feed wet air flow;

said filter structured to channel said feed wet air flow and said stream of ram air flow through said vapor membrane such that there is semi permeable fiber material therebetween;

said vapor membrane has a water vapor to air permselectivity greater than approximately 500;

said vapor membrane has a water vapor permeation flux greater than approximately 5000 Barrer/cm, and a water partial pressure difference between said feed wet air flow and said stream of ram air causes said water vapor to move through said vapor membrane to be captured by said stream of ram air.

13. A method for dehumidification of a feed wet air flow for an air cycle environment control system, comprising the steps of:

positioning a vapor membrane in said feed wet air flow intermediate a primary heat exchanger and a turbine;

directing a stream of ram air having a lower partial pressure of water relative to said feed wet air flow through said vapor membrane in one of a countercurrent direction and a crosscurrent direction to said feed wet air flow; and discharging said stream of ram air with captured water vapor through a purge air circuit.

14. The method of claim 13 wherein said vapor membrane is positioned intermediate a secondary heat exchanger and said turbine.

15. The method of claim 13 wherein directing said stream of ram air and said feed wet air flow through said vapor membrane eliminates said feed wet air flow from having to pass through a water extractor.

16. The method of claim 13 wherein directing said stream of ram air and said feed wet air flow through said vapor membrane eliminates said feed wet air flow from having to pass through a condenser.

17. The method of claim 13 wherein directing said stream of ram air and said feed wet air flow through said vapor membrane eliminates said feed wet air flow from having to pass through a reheater.

18. A method for dehumidification of a feed wet air flow for an air cycle environment control system, comprising the steps of:

positioning a vapor membrane in said feed wet air flow intermediate a primary heat exchanger and a turbine such that said feed wet air flow does not pass through a water extractor, condenser, or a reheater;

directing a stream of ram air having a lower partial pressure of water relative to said feed wet air flow through said vapor membrane in one of a countercurrent direction and a crosscurrent direction to said feed wet air flow; and discharging said stream of ram air with captured water vapor through a purge air circuit.

19. The device as in claim 1 wherein said feed wet air flow is compressed air.

20. The device as in claim 1 wherein said stream of ram air has a lower water partial pressure than said feed wet air flow.

21. The device as in claim 5 wherein said feed wet air flow is bleed air.

22. The device as in claim 5 wherein:

said feed wet air flow is a bleed air flow; and said stream of ram air has a lower water partial pressure than said bleed air flow.

23. The device as in claim 9 wherein said stream of ram air flows through the interior of said plurality of hollow semipermeable fiber elements.

24. The device as in claim 9 wherein said feed wet air flow is a compressed air flow and said compressed air flow flows through the interior of said plurality of hollow semipermeable fiber elements.

25. The device as in claim 9 wherein said feed wet air flow is a compressed air flow having a higher water vapor partial pressure than said stream of ram air.

26. The device as in claim 12 wherein said feed wet air flow is a compressed bleed air flow, said compressed bleed air flow has a higher water partial pressure than said stream of ram air thereby creating a water partial pressure difference, and said water partial pressure difference between said compressed bleed air flow and said stream of ram air causes said water vapor to move through said vapor membrane to be captured by said ram air flow without changing to a liquid state.

27. A device for dehumidification of a wet air flow for an air cycle environment control system comprising:

a vapor membrane formed of a plurality of semipermeable fiber elements;

said vapor membrane mounted in a filter having an air inlet port and an air exit port for flow through of said wet air flow containing water vapor;

said filter having inlet ports and exit ports for flow through of a ram air flow in one of a countercurrent direction and a crosscurrent direction to said wet air flow, said ram air flow having a lower water partial pressure than said wet air flow thereby creating a water partial pressure difference between said wet air flow and said ram air flow;

wherein feed air flow comprises bleed air;

wherein said water partial pressure difference causes said water vapor to move through said plurality of semipermeable fiber elements of said vapor membrane to be captured by said ram air flow without changing to a liquid state.

28. The device as in claim 27 wherein said plurality of semipermeable fiber elements are hollow and said ram air flow flows through the interior of said plurality of semipermeable fiber elements.

29. The device as in claim 27 wherein said plurality of semipermeable fiber elements are hollow, said wet air flow is a compressed air flow, and said compressed air flow flows through the interior of said plurality of semipermeable fiber elements.

30. The device as in claim 27 wherein said filter is insertable intermediate a turbine and one of a primary heat exchanger and a secondary heat exchanger of said air cycle environment control system.

31. The device as in claim 27 wherein said vapor membrane has a water vapor to air permselectivity greater than approximately 200.

32. The device as in claim 27 wherein said vapor membrane has a water vapor permeation flux greater than approximately 1000 Barrer/cm.

33. A method for dehumidification of a wet air flow for an air cycle environment control system, comprising the steps of:

positioning a vapor membrane in said wet air flow intermediate a primary heat exchanger and a turbine;

directing a ram air flow having a lower partial pressure of water relative to said wet air flow through said vapor membrane in one of a countercurrent direction and a crosscurrent direction to said wet air flow; and discharging said ram air flow with captured water vapor through a purge air circuit, without changing to a liquid state, wherein directing said ram air flow and said wet air flow through said vapor membrane eliminates said wet air flow from having to pass through a reheater.

34. The device as in claim 33 wherein said vapor membrane has a water vapor permeation flux greater than approximately 5000 Barrer/cm.

35. The device as in claim 1 wherein said feed wet air flow is bleed air.

36. The device as in claim 9 wherein said feed wet air flow is bleed air.

37. The device as in claim 13 wherein said feed wet air flow is bleed air.

38. The device as in claim 27 wherein said feed wet air flow is bleed air.

* * * * *